United States Patent
Heimann et al.

(10) Patent No.: US 11,034,905 B2
(45) Date of Patent: Jun. 15, 2021

(54) PROCESS AND PRODUCTS USING A ROTARY COMPRESSION UNIT

(71) Applicant: ECAP BIOENERGY, LLC, Mexico, MO (US)

(72) Inventors: Robert Heimann, Centralia, MO (US); Allison Talley, Mexico, MO (US)

(73) Assignee: ECAP BIOENERGY, LLC, Mexico, MO (US)

(*) Notice: Subject to any disclaimer, the term of this patent is extended or adjusted under 35 U.S.C. 154(b) by 0 days.

(21) Appl. No.: 15/263,264

(22) Filed: Sep. 12, 2016

(65) Prior Publication Data

US 2017/0073598 A1    Mar. 16, 2017

Related U.S. Application Data

(60) Provisional application No. 62/217,325, filed on Sep. 11, 2015.

(51) Int. Cl.
*C10L 5/42*    (2006.01)
*C09K 17/14*   (2006.01)
(Continued)

(52) U.S. Cl.
CPC ............ *C10L 5/42* (2013.01); *B01J 20/20* (2013.01); *B01J 20/3035* (2013.01); *B01J 20/3078* (2013.01); *C01B 32/324* (2017.08); *C01B 32/336* (2017.08); *C05F 3/00* (2013.01); *C05F 3/06* (2013.01); *C05F 11/00* (2013.01); *C09K 17/14* (2013.01); *C10L 1/00* (2013.01); *C10L 5/06* (2013.01); *C10L 5/36* (2013.01); *C10L 5/361* (2013.01); *C10L 5/363* (2013.01); *C10L 5/365* (2013.01); *C10L 5/447* (2013.01);
(Continued)

(58) Field of Classification Search
CPC combination set(s) only.
See application file for complete search history.

(56) References Cited

U.S. PATENT DOCUMENTS

2011/0011721 A1    1/2011  Champagne
2011/0212012 A1    9/2011  McAlister
(Continued)

FOREIGN PATENT DOCUMENTS

WO       2014146206        9/2014
WO    WO-2014146206 A1 *  9/2014  ............. C10B 41/00

OTHER PUBLICATIONS

ISR of PCT/US2016/051379 dated Dec. 9, 2016.

*Primary Examiner* — Ellen M McAvoy
*Assistant Examiner* — Chantel L Graham
(74) *Attorney, Agent, or Firm* — The Small Patent Law Group LLC; Jay J. Hoette

(57) ABSTRACT

A fertilizer/soil conditioner or a fuel source material is formed by processing animal waste by-products through the use of a rotary biomass dryer system. The animal waste by-product includes without limitation manure obtained from cattle or swine; feed lot bedding, poultry litter, a digestate of animal waste by-products obtained from an anaerobic digester, municipal waste, waste meat renderings, waste meat, or a mixture thereof. The processed material may comprise a higher amount of ash and a lower amount of volatile material than the animal waste by-product. The processed material may be stored as a powder or processed into pellets, logs, pucks, briquettes or another convenient shape form.

23 Claims, 5 Drawing Sheets

(51) Int. Cl.

| | | |
|---|---|---|
| *C05F 3/00* | (2006.01) | |
| *C05F 3/06* | (2006.01) | |
| *C10L 1/00* | (2006.01) | |
| *C10L 5/36* | (2006.01) | |
| *C10L 5/06* | (2006.01) | |
| *C10L 9/10* | (2006.01) | |
| *C10L 10/04* | (2006.01) | |
| *B01J 20/20* | (2006.01) | |
| *B01J 20/30* | (2006.01) | |
| *F26B 5/14* | (2006.01) | |
| *F26B 15/26* | (2006.01) | |
| *C05F 11/00* | (2006.01) | |
| *C10L 9/08* | (2006.01) | |
| *C10L 5/44* | (2006.01) | |
| *C01B 32/324* | (2017.01) | |
| *C01B 32/336* | (2017.01) | |

(52) U.S. Cl.
CPC ............... *C10L 9/083* (2013.01); *C10L 9/086* (2013.01); *C10L 9/10* (2013.01); *C10L 10/04* (2013.01); *F26B 5/14* (2013.01); *F26B 15/26* (2013.01); *C10L 2200/0469* (2013.01); *C10L 2230/22* (2013.01); *C10L 2290/06* (2013.01); *C10L 2290/08* (2013.01); *C10L 2290/30* (2013.01); *F26B 2200/02* (2013.01); *F26B 2200/12* (2013.01); *Y02A 40/20* (2018.01); *Y02E 50/10* (2013.01); *Y02E 50/30* (2013.01); *Y02P 20/145* (2015.11); *Y02W 30/40* (2015.05)

(56) References Cited

U.S. PATENT DOCUMENTS

2013/0025188 A1\* 1/2013 Cheiky ................. C01B 32/366
                                                                          44/307
2015/0007446 A1    1/2015 Heimann \* cited by examiner

PROCESS AND PRODUCTS USING A ROTARY COMPRESSION UNIT

CROSS-REFERENCE TO RELATED APPLICATIONS

This application claims priority to and the benefit of U.S. provisional patent application Ser. No. 62/217,325, titled "Process and Products Using Rotary Compression Unit," filed Sep. 11, 2015, the contents of which are incorporated herein by reference in their entirety and continued preservation of which is requested.

FIELD

The present disclosure relates generally to a method of using a rotary biomass unit to form fertilizer/soil conditioner or a fuel source material from animal waste by-products. More specifically this disclosure relates to a process of treating and/or drying animal waste by-products, as well as the fertilizer/soil conditioner, bio-oil, bio-coal, bio-fuel, bio-char, coke, and/or activated carbon formed therefrom.

BACKGROUND

The statements in this section merely provide background information related to the present disclosure and may not constitute prior art.

World population growth is inherently accompanied by an increase in the demand for clean water and food products. Over the last few decades, the food industry has responded to the increase in global demand for food products with the confinement feeding of birds and mammals in order to extract efficiency related to mass production. The downside of increasing food production efficiency is the continued growth in the volume of manure and other waste by-products. Conventional composting methods, as well as the direct field application of these waste by-products, leads to overloading the fields with waste by-products and contributes to an increase in drinking water contamination. Anaerobic Digesters (AD) have been touted as a solution, but they too are amongst the contributors to global water pollution.

Recent studies infer that the increase in water pollution due to animal waste by-product contamination may be responsible for serious sickness in humans and animals. One example of animal waste by-product contamination results from the increased use of poultry litter in agriculture areas. The application of the litter to fields is leading to contaminated runoff into water sources around agricultural districts. High levels of nitrates in the litter have been shown to cause an increase in Blue Baby Syndrome as well as increases in certain cancers, respiratory illness, and livestock illness. High levels of other nutrients as well as off-gassing of ammonia can lead to eutrophication of waters and contamination. Poultry litter, however, due to its bulky and wet nature is expensive to export and is most commonly used in the United States in the locality in which it is produced. Poultry litter can be referred to as the waste from a layer operation or a broiler operation. The differences between these two operations resides in the moisture content of the final waste product. The implementation of revised regulations regarding the way that poultry litter may be used in agriculture has been considered, but is not a long-term solution.

SUMMARY

The present disclosure generally provides a method of converting an animal waste by-product into a fertilizer/soil conditioner or a fuel source material. Fertilizer/soil conditioner produced by this method acts as a timed or slow release sequestration of any pharmaceuticals and Phosorus (P), Potasium (K), and Nitrogen (N) while any bacteria, fungus, and hormones present are destroyed. The method comprises: providing an animal waste by-product; providing a rotary biomass dryer system; feeding the animal waste by-product to the dryer system; mixing and heating the animal waste by-product in the rotary mass dryer system in order to separate the animal waste by-product into steam and the fertilizer/soil conditioner or fuel source material; removing the steam from the apparatus; cooling the fertilizer/soil conditioner or fuel source material; and collecting the fertilizer/soil conditioner or fuel source material after it exits the rotary biomass dryer system. The rotary biomass dryer system may be a stationary (non-mobile) unit or a mobile unit. The rotary biomass dryer system may be operated in a location that is at or proximate to the site upon which the animal waste by-product is formed.

In one form of the present disclosure, the rotary biomass dryer system comprises: a feeding mechanism; a rotory compression unit (RCU); at least one of a reflux condenser and a gas management manifold; an aftercooler stage; and an exit mechanism. The animal waste by-products enter the RCU through the feeding mechanism. The RCU includes a screw and a barrel and optionally, one or more flow disruptors. Steam is removed from RCU as the fertilizer/soil conditioner or fuel source material passes through the reflux condenser. The fertilizer/soil conditioner or fuel source material is cooled in the aftercooler stage. The fertilizer/soil conditioner or fuel source material exits the rotary biomass dryer system through the exit mechanism. When utilized, the one or more flow disrupters cause the animal waste by-product to fold over onto its self, thereby, allowing for the occurrence of more uniform mixing and drying.

According to another form of the present disclosure, the rotary biomass dryer system further comprises one or more of a dewatering press; a primary reduction unit for breaking down heavily compacted or matted animal waste by-products; a secondary reduction unit to further size the animal waste by-products; a bin to provide mixing and optionally add fiber in the form of sawdust or the like; and a device that converts the fertilizer/soil conditioner or fuel source to a dried product that is in a transportable geometric form. The transportable geometric form may include but not be limited to a pellet, a log, a puck, or a briquette.

The animal waste by-product can be without limitation manure obtained from cattle or swine, feed lot bedding, poultry litter, a digestate of animal waste by-products obtained from an anaerobic digester, municipal waste, waste meat renderings, waste meat, and/or a mixture thereof. Alternatively, the animal waste by-product is poultry litter, with or without plant fiber. The animal waste by-product may have a moisture content between about 2 wt. % and about 90 wt. %.

The fuel source can be without limitation a bio-oil, a bio-fuel, bio-char, bio-coke, heavy tars, pyroligneous acid, and/or bio-coal. According to one form of the present disclosure, the animal waste by-product is a digestate of animal waste obtained from an anaerobic digester and the fuel source formed is bio-coal. During operation the rotary biomass dryer system can subject the animal waste by-product to non-destructive drying, which forms fertilizer/soil conditioner; a partially destructive drying condition which forms at least some carbonized material; or destructive drying, which forms bio-oil, bio-fuel, bio-char, or bio-coal. The rotary biomass dryer may be operated at a temperature and pressure that destroys pharmaceuticals, hormones, fungi, viruses, bacteria, prions, and other microbes. Organic and inorganic hydroxides may be added to the process to increase the destruction of these organisms by the RCU. During operation of the rotary biomass dryer, one or more gases can be moved away from the reflux condenser in order to form the bio-char. In addition, coke can be formed by pretreating the bio-coal or bio-fuel to remove inorganic compounds. The bio-coal, bio-fuel, or bio-char can be subjected to another or second energy source and an activation agent in order to form activated carbon. Organic and/or inorganic additives may be added to the animal waste in order to reduce boiler slagging and corrosion; boost the BTU output of the formed fuel source; or sequester pharmaceuticals, nutrients, and metals in the formed fertilizer/soil conditioner to provide for timed or slow release. The formed fertilizer/soil conditioner can be produced by the addition of a DIE on the output end of the RCU screw.

According to yet another form of the present disclosure, a fertilizer/soil conditioner or fuel source material is formed from animal waste by-products according to the method described above and further defined herein. The animal waste/feedlot by-product can be without limitation poultry litter or a digestate of animal waste by-products obtained from an anaerobic digester. The fuel source formed, includes but is not limited to, bio-oil, bio-coal, bio-fuel, bio-char, coke, and/or activated carbon material. The formed fertilizer/soil conditioner or fuel source material comprises a higher amount of ash and a lower amount of volatile material than the initial animal waste by-product. The formed material can be stored or processed into pellets, logs, pucks, briquettes or another convenient geometric form.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which.

Figure 1:
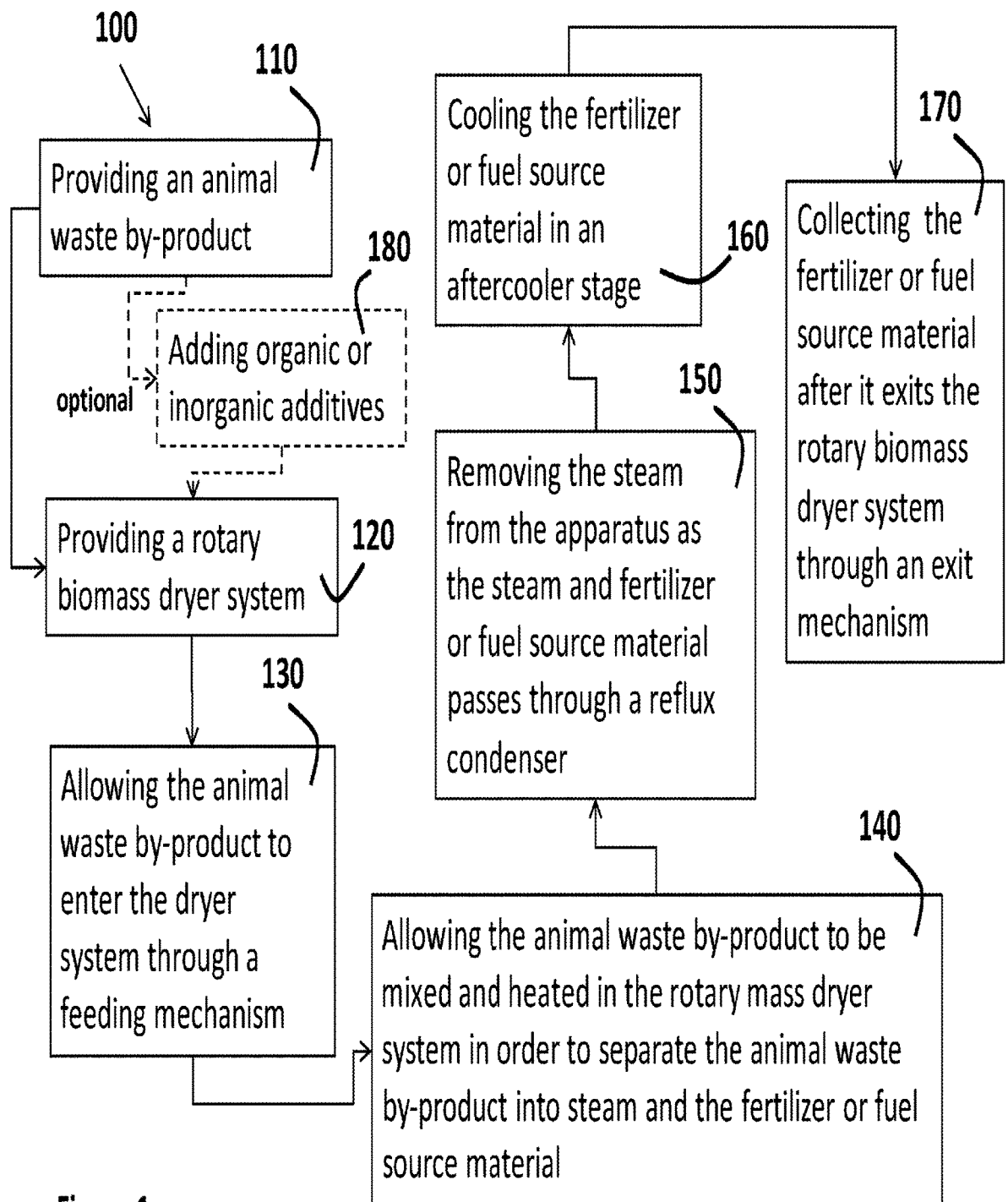
FIG. 1 is a schematic representation of a method for forming a fertilizer/soil conditioner or fuel source material from an animal waste by-product according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure addresses the processing of moisture-containing or water-laden animal waste by-products materials using a rotary biomass dryer system to form a fertilizer/soil conditioner or a fuel source material. The words "fertilizer/soil conditioner" refers to a material that has nutrients which can be added to soil or land to increase fertility. It can include not only waste by-products and also soil additives among other traditional fertilizer/soil conditioners. The use of a rotary biomass dryer system provides multiple benefits over conventional methods of disposing of animal waste by-products. Such conventional methods include (i) composting the waste by-product material, (ii) anaerobically digesting the waste by-product material, or (iii) combusting the waste by-product material.

The animal waste by-product used to form the fertilizer/soil conditioner or fuel source material according to the teachings contained herein is described throughout the present disclosure as poultry litter, as one particular example, in order to more fully illustrate the method and labor. The use of animal waste by-products other than poultry litter is contemplated to be within the scope of the present disclosure as discussed in more detail below.

In order to properly compost poultry litter, a large space and extreme amounts of time are required. Composting can also result in contamination of the ground water if proper equipment is not utilized and off gassing of ammonia and methane becomes an increasingly larger problem as the poultry litter ages. Due to the high nitrogen and ammonia content which can hinder bacterial growth in high concentration, anaerobically digesting the litter becomes costly and time consuming as the batches must be made smaller than normal or mixed in with other manures to dilute the nitrogen based components. Combustion of the poultry litter is currently being utilized in several plants located in Minnesota, U.S. and in the United Kingdom either as the sole combustion material or co-fired with another fuel source. The cost efficiency of the combustion decreases with the heterogeneity of the material, high moisture content, and low bulk density of the poultry litter. High moisture and heterogeneity of the litter leads to inefficiency of the boiler as well as makes feeding the boiler difficult. Low bulk density of the litter can make transportation and handling very costly.

Additionally, poultry litter is contaminated with excessive nitrogen compounds in the form of nitrates, which may be associated with serious human and livestock health problems ranging from eye/optic nerve development, blue baby syndrome and even certain cancers. Pending lawsuits and environmental regulations will cause the regulation of quantities of waste streams containing high nitrates, phosphorus (P), potassium (K), and nitrogen (N), leaching into waterways to protect human and animal health. Conventional methods of removing nitrates, in particular from drinking water to comply with the U.S. Safe Drinking Water Act, requires the use of chemicals and activated carbon causing treatment plants to incur additional expenses and creating a waste stream adding to the solid waste landfill burden. The problem is not only a health issue but also a cost of transportation issue as these waste streams can contain moisture content (MC) upwards to 70 wt. %.

In addition to nitrate contamination, poultry litter is also contaminated with high levels of gut flora and other microbes acquisitioned after expulsion and during storage. These microbes can include species of bacterium, fungi, whole parasites, parasitic larvae and eggs, spores, viruses, and prions. Most microbes treated at 70-100° C. are rendered as dead or inactive, thus making them harmless to humans and animals when stored or applied outside. Further details associated with poultry litter, the disposal thereof, and diseases arising therefrom can be found in articles published in (a) Journal of Environmental Quality; January/February 1998; 27, pgs 92-99; (b) World's Poultry Science Journal, Vol. 66, December 2010, pgs 673-698; and (c) http://www.psypost.org/2015/09/new-prion-disease-raises-questions-about-whether-alzheimers-and-parkinsons-couldbe-infectious-37371, the entire contents of which are hereby incorporated by reference.

A rotary biomass dryer system provides a low cost alternative to conventional methods for disposing of animal waste by-products. The rotary biomass dryer system requires no external energy, only a motor to rotate a compression auger effectively heating the waste material by compression and friction to generate in-situ steam. The dryer apparatus in the rotary biomass dryer system, which often has an adjustable nozzle or a choke flange is also equipped with a tapered compression screw. During processing, only the waste by-products that are in direct contact with the compression screw or elongated tube is dried during the process. One example of a rotary biomass dryer system is a Rotary Compression Unit (RCU) as described in the previously referenced patents and applications.

A rotary biomass dryer system having an RCU has the potential to process multiple diverse waste streams, including, but not limited to animal waste, into a value-added product. In one form, the resultant product may be a slow-released or manage-released, mechanism of adding phosphorus (P), potassium (K), and nitrogen (N), densified, and storage ready fertilizer/soil conditioner. In another form, the resultant product may be a solid biomass fuel that is homogenous, high in BTU capacity and low in moisture content for combustion. The RCU and process using the RCU may be deployed in a plant setting to produce high-quality, solid bio-fuels from non-woody and woody sources of biomass or modified into a smaller, farm-friendly unit or a mobile configuration for use in the process of the present disclosure. An example of a mobile application can be found in a co-pending U.S. Patent Application No. 62/266,210 filed Dec. 11, 2015, which is commonly owned with the present application and the entire contents of which are hereby incorporated by reference. The processing of all waste into a fuel source would allow disposal of wastes in a manner that would inhibit the contamination of groundwater as well as offer farming districts the chance to produce their own renewable source of energy. Processing of the poultry litter into fertilizer/soil conditioner that can be stored and easily transported allows the material to be shipped less expensively and more efficiently to areas of necessity. This allows for the recapture of the important elements, phosphorus (P), potassium (K), and nitrogen (N), for fertilization of the soils without overloading and contaminating the ground waters in an area. The addition of certain additives to the fertilizer/soil conditioner can provide for a time release function. The RCU process can be configured for destroying/inactivating leftover pharmaceuticals and hormones in the animal wastes. This makes it field safe for plants as it has been shown that plants have the ability to uptake pharmaceuticals and hormones leftover in waste manures.

Referring now to FIG. 1, the method 100 of the present disclosure for converting an animal waste by-product into a fertilizer/soil conditioner or a fuel source material, generally comprises: providing 110 an animal waste by-product; providing 120 a rotary biomass dryer system; allowing 130 the animal waste by-product to enter the dryer system; allowing 140 the animal waste by-product to be mixed and heated in the rotary mass dryer system in order to separate the animal waste by-product into steam and a fertilizer/soil conditioner or fuel source material; removing 150 the steam from the apparatus; cooling 160 the fertilizer/soil conditioner or fuel source material; and collecting 170 the fertilizer/soil conditioner or fuel source material after it exits the rotary biomass dryer system. Optionally, the method 100 further comprises 180 adding organic and inorganic additives to the animal waste that will reduce boiler slagging and corrosion, boost the BTU output of the formed fuel source, or sequester nutrients and metals in the formed fertilizer/soil conditioner to provide for timed or slow release.

The method 100 of the present disclosure addresses one or more of the issues associated with conventional means of disposing of animal waste by-products by deploying a rotary biomass drying system, e.g., a Rotary Compression Unit (RCU), as a mobile or stationary (non-mobile) and/or modularized unit capable of processing waste streams at or proximate to the site of generation or upon which the animal waste by-product is formed. The RCU may process animal waste by-products that comprise high moisture or low moisture content (MC) in the range from about 2 wt. % to about 90 wt. % based on the overall weight of the animal waste by-product.

Figure 2:
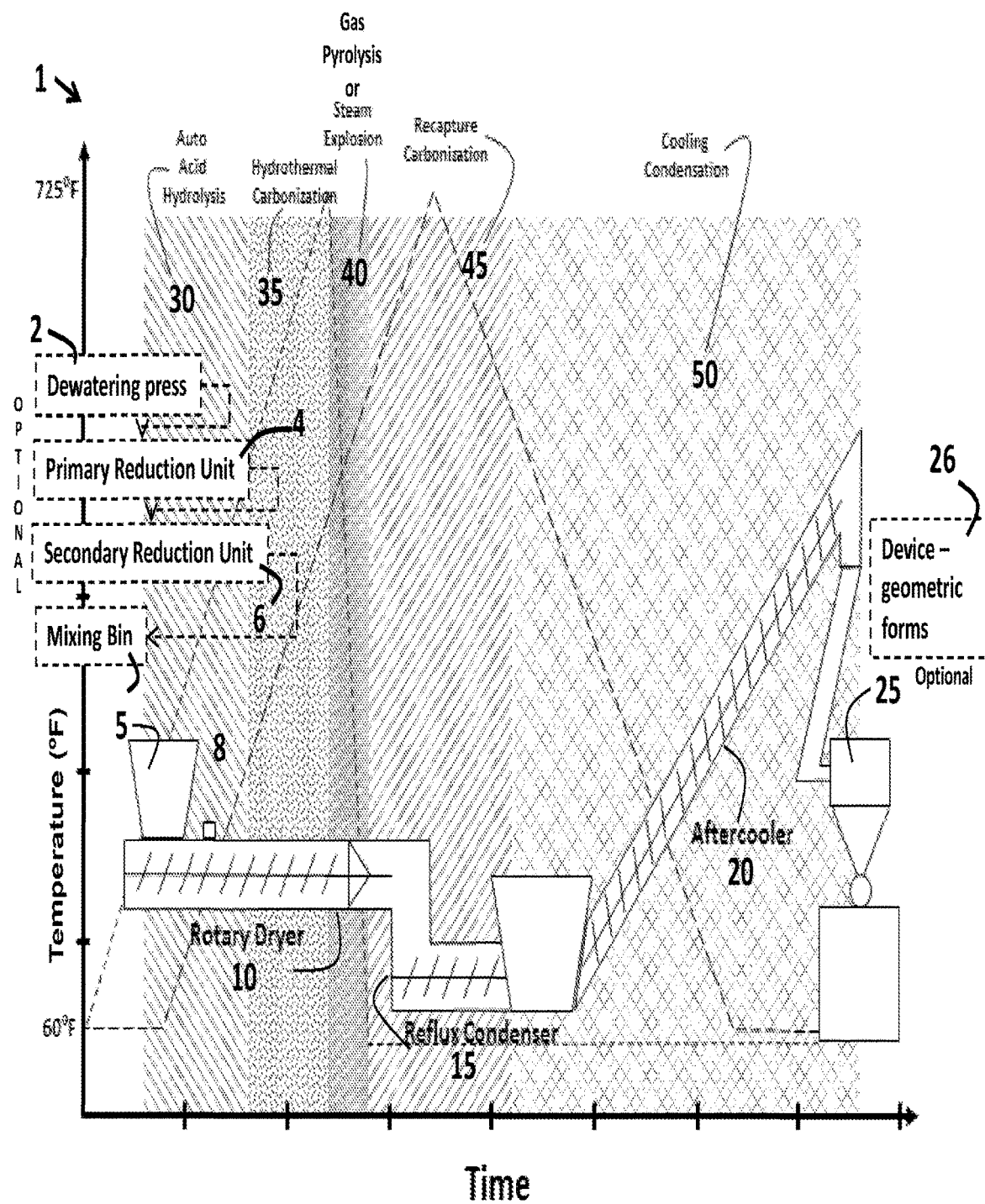
FIG. 2 is a schematic representation of a rotary biomass dryer system.

Referring now to FIG. 2, the rotary biomass drying system (1) that generally comprises a feeding mechanism 5, a rotary biomass dryer 10 or RCU, at least one of a reflux condenser or a gas management manifold 15, an aftercooler stage 20, and an exit mechanism 25. Along the entire length of the system 1, the various portions of the system 1 may also be described to comprise various zones, namely, auto acid hydrolysis 30, hydrothermal carbonization 35, steam explosion and/or gas pyrolysis 40, recapture carbonization 45, and cooling condensation 50. Some of these zones may overlap with one another as shown in FIG. 1. The animal waste by-product may be subjected to any of these zones either individually or in any combination. Further details associated with a rotary mass dryer system are described in U.S. Pat. No. 8,667,706, the entire contents of which is hereby incorporated by reference.

A rotary biomass dryer requires a uniform feed rate in order to achieve a relatively high efficiency. In other words, it is desirable that the apparatus maintains a uniform flow rate. Thus the rotary biomass dryer may include one or more feed improvements, namely, a crammer feeder, an in-feed mixer, a preheater, and/or a dual belt feeder to enhance the uniformity of the flow rate. The rotary biomass dryer may also incorporate the use of a pretreatment, such as without limitation in-situ acid treatment, e.g., auto acid hydrolysis or inorganic sequestering. Further details regarding specific improvement made to a rotary biomass drying system can be found in co-pending U.S. patent application Ser. Nos. 15/066,894 filed Mar. 10, 2016 which claims priority to 62/130,820 filed Mar. 10, 2015, Ser. No. 15/140,409 filed Apr. 27, 2016, which claims priority to 62/153,130 filed Apr. 27, 2015, and Ser. No. 15/210,559 filed Jul. 14, 2106 which claims priority to 62/192,266, filed Jul. 14, 2015, which are commonly owned with the present application and the entire contents of which are hereby incorporated by reference.

During processing, the animal waste by-products enter the rotary biomass dryer system through the feeding mechanism. The dryer apparatus includes a screw and a barrel and optionally, one or more flow disruptors. The screw operates as a compression screw causing an increase in pressure within the barrel and thus an increase in temperature during operation. Steam is formed and then removed from the system as the fertilizer/soil conditioner or fuel source material passes through the reflux condenser/aftercooler stage. The fertilizer/soil conditioner or fuel source material is cooled in the aftercooler stage. The fertilizer/soil conditioner or fuel source material exits the rotary biomass dryer system through the exit mechanism. When utilized, the one or more flow disrupters cause the animal waste by-product to fold over onto its self, thereby, allowing for the occurrence of more uniform mixing and drying. The one or more flow disrupters may be located on the inner surface of the barrel and project into the passageway created by the screw and the barrel. The screw is sized to fit within the barrel such that the flow disrupter does not contact the screw. According to one aspect of the present disclosure, the system may further comprise a means to adjust the barrel relative to the screw using precision controls and simple hydraulic circuits.

Figure 3:
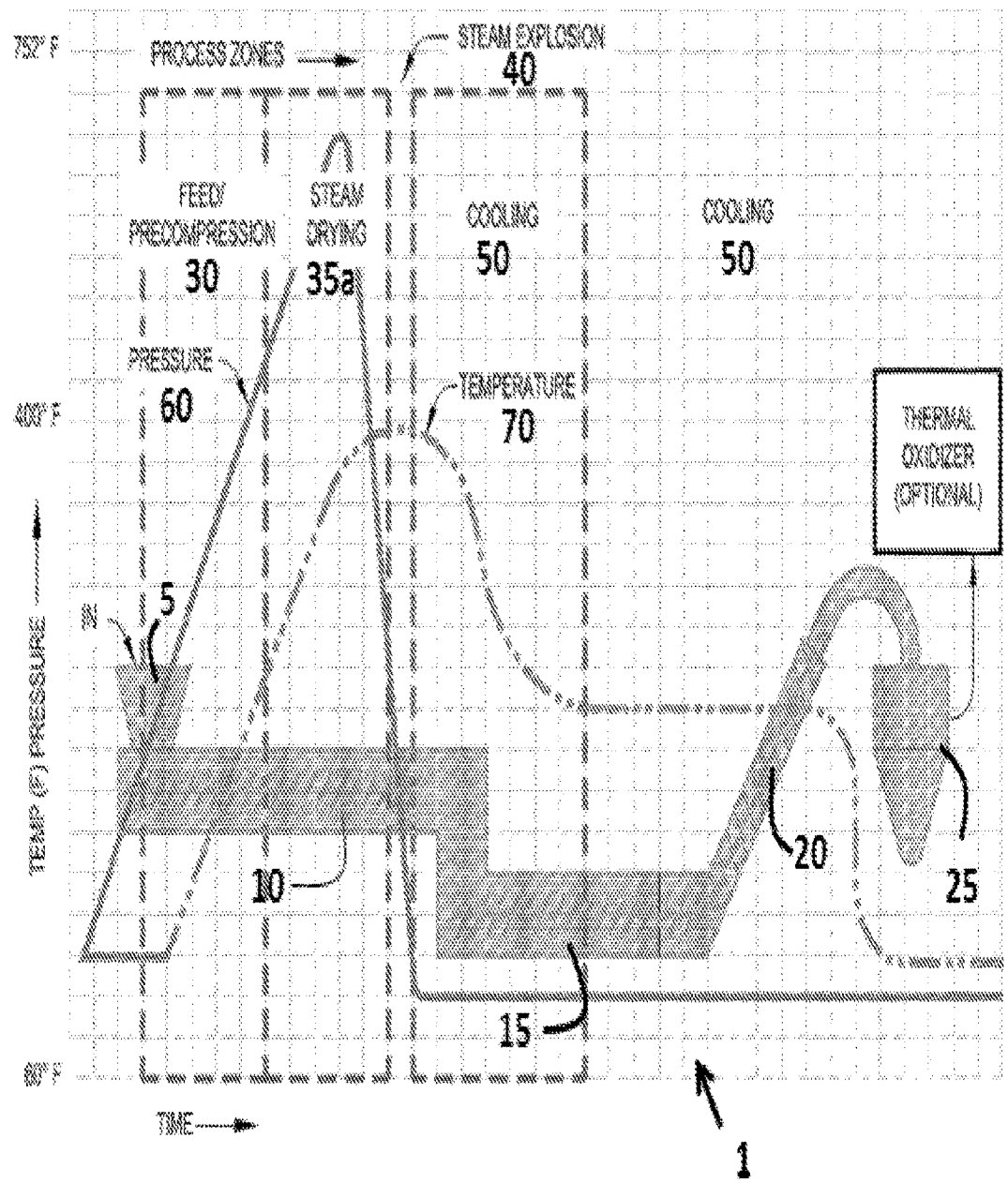
FIG. 3 is schematic representation of the rotary biomass dryer of FIG. 1 operated below the autoignition temperature.
Figure 4:
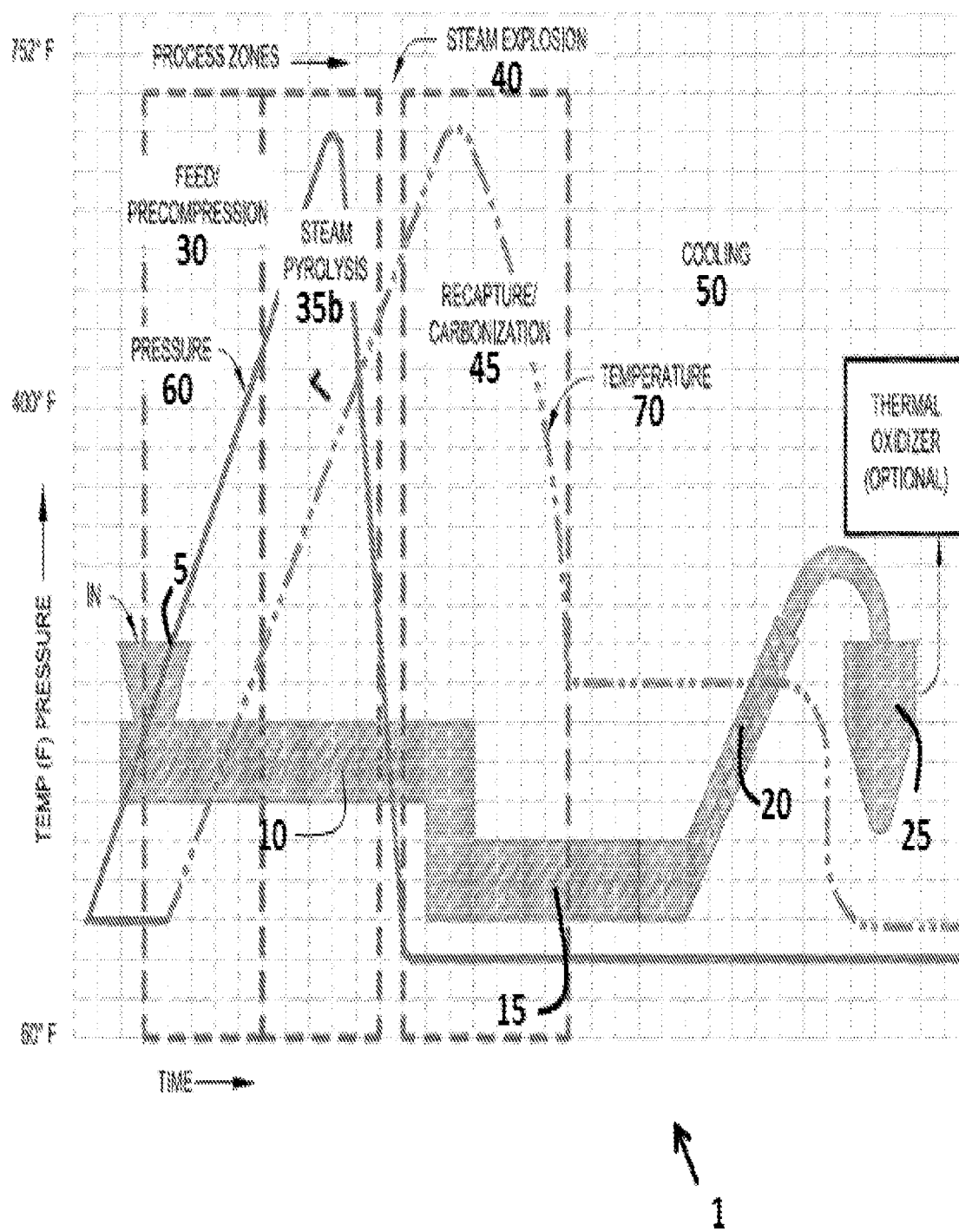
FIG. 4 is schematic representation of the rotary biomass dryer of FIG. 1 operated above the autoignition temperature.

Referring now to FIGS. 3 and 4, pressure (60) and temperature (70) that occur in a biomass drying system (1) increases during its operation as biomass material moves from a feeding mechanism (5) through a rotary dryer or RCU (10). In other words, the temperature (70) and pressure (60) increases through the pretreatment or pre-compression (e.g., auto acid hydrolysis) stage (30) and the steam drying or pyrolysis stage (35). The pressure reaches a peak during the steam drying (35*a*)/pyrolysis stage (35*b*) and then rapidly decreases as the biomass moves through the steam explosion stage (40) or from the biomass dryer (10) into the reflux condenser (15). When the temperature (70) does not reach the autoignition temperature limit, a recapture/carbonization stage does not occur, but rather the biomass material moves from steam drying (35*a*) directly into the cooling stage (50) as shown in FIG. 3. However, when the temperature (70) does reach the autoignition temperature limit, a recapture/carbonization stage (45) occurs following the steam pyrolysis (35*b*) stage and the initiation of the cooling stage (50) is delayed as shown in FIG. 4.

The fuel source may be without limitation a bio-oil, a bio-fuel, bio-char, or bio-coal. During operation the rotary biomass dryer system subjects the animal waste by-product to either non-destructive drying (i.e., operated below the autoignition temperature limit), which forms fertilizer/soil conditioner, or destructive drying (i.e., operated above the autoignition temperature limit), which forms bio-oil, bio-fuel, bio-char, or bio-coal. A rotary biomass dryer functions as a steam dryer as it uses the heat of compression and friction in the Second Law of Thermodynamics to produce steam thereby effectively drying the wet biomass material. The rotary biomass dryer typically functions in the non-destructive range, up to a temperature of about 176° C. (350° F.). Within this temperature range, both unbound waters and bound waters are released from the animal waste by-product. Drying above 176° C. (350° F.) is considered destructive drying. Destructive drying can also be known as roasting or roasted material.

The rotary biomass dryer may be operated at a temperature and pressure that destroys hormones, bacteria, prions, and other microbes. During operation of the rotary biomass dryer, one or more gases can be moved away from the reflux condenser in order to form the biochar. The gases can be processed through a spray condenser to induce phase separation and collect any liquid streams. Moreover, coke can be formed by pretreating the bio-coal or bio-fuel to remove inorganic compounds, such as chlorine, plant nutrients, and minerals, among others. The bio-coal, bio-fuel, or bio-char can be subjected to another or second energy source, such as ovens or microwaves, and an activation agent, such as carbon dioxide, in order to form activated carbon.

Referring again to FIG. 2, according to another form of the present disclosure, the rotary biomass dryer system 1 further comprises: one or more of a dewatering press 2 for use with very high moisture materials; a primary reduction unit 4, such as a shredder or knife mill for breaking down heavily compacted or matted animal waste by-products; a secondary reduction unit 6 to further size the animal waste by-products for processing; a bin 8 to provide mixing and optionally add fiber in the form of sawdust or the like and/or to add other additives; and a device 26, such as a pellet mill or briquetter, that converts the fertilizer/soil conditioner or fuel source to a dried product that is in a transportable geometric form. The transportable geometric form may include but not be limited to a pellet, a log, a puck, or a briquette.

Various additives that enhance the processing of the animal waste by-products may be added to the animal waste by-products. For example, the addition of fibrous cellulosic materials provide for compression resistance within the RCU. These fibrous cellulosic materials may include but not limited to wood processing waste or agriculture waste. The addition of moisture to these additive materials may also provide a resource for heat or steam generated in the RCU.

Certain additives can also be used to enhance combustion such as Kaolin that will capture silica from plants in the form of slag to reduce boiler slagging and corrosion. Additionally, BTU boosters such as coal fines, duck weed, coffee grounds and industrial waste can be added to enhance bird and/or mammal waste for fuel applications.

Plant nutrients for sustained crop production are critical. However, when these nutrients such as P, K and N are field applied in excess, the subsequent plant update and/or runoff into streams, rivers and lakes causes fish kills and leads to human and animal disease. Certain additives can be deployed during processing with the RCU such as, both inorganic and organic materials to sequester nutrients and metals; thereby effectively timed or slow release. For example, organic bio-chars possess both meso and micro pores capable of absorbing large quantities of liquids. Further these bio-chars can be treated with microbes to enhance the breakdown rate of manure. Additionally, simple bentonite clays or any other porous materials such as pumice that are known to absorb and hold liquids can be used. The addition of acids, such as formic and acetic will enhance the breakdown of cellulose into smaller particles to enhance binding of nutrients by increasing surface area. The addition of inorganic additives, such as aluminum sulphate (alum) can neutralize the electric double layer on particles thereby providing a flocculating means. Additionally, polyethylenemine, a cationic polymer used in water treatment to flocculate solids, or any other suitable flocculant, can sequester both organic and inorganic molecules in aqueous systems by forming bridges, charge neutralization, or charge reversal. The family of flocculating polymers also sequesters pesticides. Dispersing agents may also be used in order to keep the biochar particles suspended in water for drip irrigation operations.

The RCU equipped with a reflux condenser is capable of producing biochar under fast pyrolysis using process generated steam to provide shielding against oxidation. The RCU/Reflux condenser typically provides the means to condense the steam/oil mix from fast pyrolysis back into the biochar to produce high BTU fuel. This can be accomplished by piping the steam/gas vapor streams back into the biochar as it cools.

Bio oil can be produced by the RCU in the final zone immediately prior to the material exiting the barrel. As the biomass exits the screw/barrel, the gas produced by the intense pressure and temperature is spontaneously released. Conversely, as the biomass enters the final compression zone, the first gas to be released is steam @100° C. and the final gas released is pyrolysis gas or biogas. This diverts the gas phases into steam and biogas and the solids phase into char. The steam phase can be passed through the char as an activation agent to increase porosity or the steam phase is exhausted while the gas phase is cooled and condensed into bio oil. Since the temperatures of the process can be controlled; i.e. manage severity, high temperature; secondary reactions are avoided and more compounds are preserved in the final bio-oil which more readily converts to fuels for transportation and the like.

The animal waste by-product used in the process of the present disclosure may be derived from any type of ruminant, monogastric and/or cloacal animals. The animal waste by-product can include, but not be limited to, manure obtained from cattle or swine, feed lot bedding, poultry litter, a digestate of animal waste by-products obtained from an anaerobic digester, municipal waste, waste meat renderings, waste meat, or a mixture thereof. Alternatively, the animal waste by-product is poultry litter. According to one form of the present disclosure, the animal waste by-product is a digestate of animal waste obtained from an anaerobic digester and the fuel source formed is bio-coal.

Wet cake, and dry distiller's grains are another waste and/or co-product from the corn and cellulosic ethanol distillation that may be effectively processed with the RCU. The wet cake or distillers grains may be processed as received from an ethanol process, or alternatively amended with fibrous material to aid in the processing. Additionally, the wet cake or distiller's grains may be dewatered prior to RCU processing, with or without additional fibrous materials. Without wishing to being bound to any theory or explanation, it is believed that the processed wet cake or dry distiller's grains would undergo steam explosion and expanded surface area, which is believed to increase overall reactivity of the processed material, and the increased reactivity would yield additional ethanol production.

In one form of the present disclosure, the processed materials may be further processed in a typical ethanol production process to achieve additional ethanol production. If fibrous materials are required, any biomass may be used, including corn stover, grass, straw, wood materials, sawdust, among others, at inclusion rates from 5-75%, more preferably 20-50%, and typically 30-40%. The benefit of processing and reusing the wet cake or dry distiller's grains is the added efficiency of ethanol production from a unit of corn grain, and the resultant reduction in carbon footprint, and the resultant potential reduction in grain usage and land usage to achieve the same ethanol production.

Figure 5B:
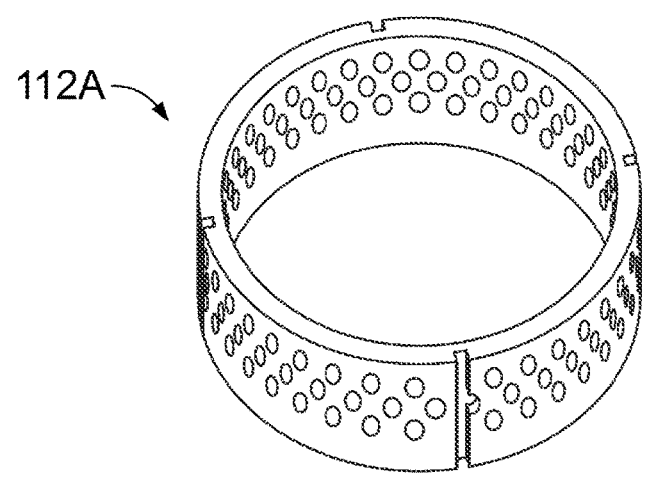
FIG. 5B is a perspective view of one form of an output die configured for placement at an output of an RCU for extruding material in a desired shape form.
Figure 5A:
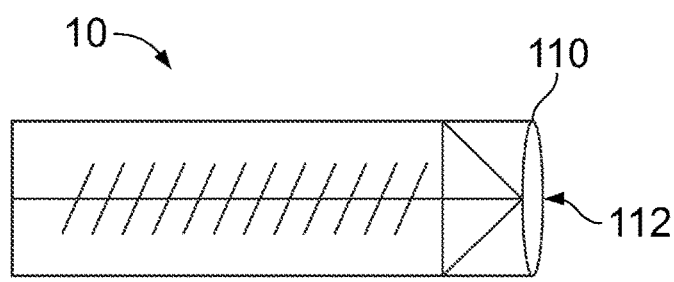
FIG. 5A is a schematic side view of a rotary compression unit (RCU) associated with the rotary biomass dryer of FIG. 1 having an output die for extruding material in a desired shape form.
Figure 5C:
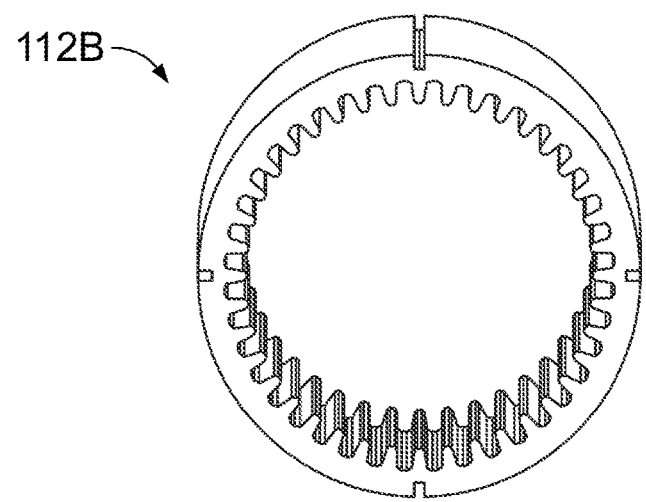
FIG. 5C is a perspective view of another form of an output die configured for placement at an output of an RCU for extruding material in a desired shape form.

Referring to FIGS. 5A-5B, in yet another form of the present disclosure, the RCU delivers an output that is formed into a convenient and suitable shape. Many fertilizer/soil conditioner or fuel applications require an output stream to be in a readily handleable shape largely to avoid handling loose material and any subsequent dust exposure to operators/workers. The RCU 10 can be configured with shape forming tooling 112 attached to an output end 110 of the barrel. When material is processed using feedstock containing lignin such as wood or ag waste, the pressure produced by the compression screw is sufficient to extrude pellet type shapes. In one form, the output die can include a plurality of holes as shown with respect to die 112A of FIG. 5B. In yet another form, the output die can include semi-sphere type shapes as shown with respect to die 112B of FIG. 5C. The dies allow for direct pellet shape formation without a separate densification process.

When forming bio-char, a further benefit can be achieved for the storage and/or transportation of hazardous material. As a result of the porous nature, bio-char formed according to the process of the present disclosure, can be used as a carrier of hazardous waste materials. The biochar can be used to soak up or adsorb the hazardous waste materials to produce a solid waste product. This solid waste product produced may be used in a combustion environment as a fuel in order to mitigate the waste and provide heat value in combustion chambers. Hazardous wastes mitigated in this manner could include, but are not limited to waste inks, liquid medical waste, waste chemicals, etc. This method produces a fuel product while mitigating a liquid waste stream that entities would otherwise have to pay to dispose of in a manner in accordance with regulations. In yet another form, sodium thiosulfate can be added to bio-char as a way to sequester chlorine. This can be helpful if the biochar was going to be used to treat water or to be added to an anaerobic digestion process that had too much chlorine.

The following specific examples are given to illustrate the conversion of animal waste by-products to a fertilizer/soil conditioner or fuel source material according to the teachings of the present disclosure and should not be construed to limit the scope of the disclosure. Those skilled-in-the-art, in light of the present disclosure, will appreciate that many changes can be made in the specific forms which are disclosed herein and still obtain alike or similar result without departing from or exceeding the spirit or scope of the disclosure.

EXAMPLE 1

Processing of Poultry Litter

Fresh poultry droppings were obtained from a confined egg production facility. The moisture content (MC) was approximately 48-50%. Since the RCU is a compression/steam dryer and the poultry droppings had insufficient fiber to resist compression drying, additional fiber was added in the form of sawdust mixed in at 40% by weight. The combination of droppings and sawdust were successfully processed with a resulting BTU content of 7335 BTU/pound with moisture content (MC) of 21.50%. This experiment demonstrates the successful conversion of bird waste by-product to a combustible fuel as a means to reduce waste pollution.

EXAMPLE 2

Processing of Digestate from Anaerobic Digester

Fresh anaerobic digester offal at above 80% moisture content (MC), was obtained from a cattle feedlot. The waste material was first processed through a rotary squeeze press to reduce the bulk moisture content to approximately 69.49% MC and 7708 BTU/pound. The material was then processed using the RCU to approximately 11.79% MC resulting in BTU content of 9653 BTU/pound. This experiment demonstrates the successful conversion of mammal waste by-product to a combustible fuel as a means to reduce waste pollution.

EXAMPLE 3

Sterilization

The RCU is capable of reaching over 212° F. which is the temperature at which most bacteria are killed including temperature and pressure protocols to attack tougher and more dangerous types such as Clostridium difficile and the like. The RCU is capable of moist heat and steam which acts as an autoclave of sorts when materials are processed, exposing microbes to high temperatures, steam, and pressure. Materials to be treated could include poultry litter and waste meat/renderings to ensure their safety for human and animal exposure. Corn samples spiked with high levels of Aflatoxin B1 are processed using the RCU and various chemicals such as hydroxides, peroxides, and bleach. These experiments were successful in decreasing the aflatoxin concentration by as much as 88% in some cases. Hydroxides and chemicals that raised the pH to above 9 were found to be much more successful than acids when combined with the RCU treatment. Further experimental details regarding the effectiveness of commercial Mycotoxin treatment and various chemical treatments applied using a rotary biomass dryer system as a roaster on the concentration of Mycotoxins in ground corn was provided in an internal Report No. 1.2, shown below as Example 4.

EXAMPLE 4

A Comparative Study of the Effectiveness of a Commercial Mycotoxin Treatment and Various Chemical Treatments Applied Using a Rotary Biomass Dryer as a Roaster on the Concentration of Mycotoxins in Ground Corn was performed. Mycotoxins are the secondary metabolites produced by fungi on crops. These toxins have devastating effects on the agriculture industry and a large portion of agriculture research has gone into finding a solution. Unfortunately, the methods developed in many cases are expensive or not time effective. A chemical pre-treatment using a rotary biomass dryer can provide a quick, cost effective way to treat grains before they have to be sold at a lesser value or destroyed due to high levels of mycotoxins. A pre-treatment would not only reduce the exposure for animals, it would also mean farmers would be able to sell their goods at full price to elevators.

Prior to roasting the contaminated ground corn in a biomass rotary dryer the samples were mixed with 0%, 1%, and 4% of the following treatments: an unnamed commercial treatment, sodium hypochlorite solution, and a piranha solution of sulfuric acid and peroxide. The same volume of commercial treatment was also sprayed on a separate sample and was not roasted to provide a baseline concentration change for the commercial solution alone.

This experiment was performed in two parts. One part was analyzing the effects of the roasting process on the concentrations of various mycotoxins. It was hypothesized that heat and pressure alone would have some effect on the fungi that produce mycotoxins. This also established a baseline for the future when adding solutions to feed stocks in other processes. A second part was comparing the commercial solution to various chemical solutions. It was hypothesized that all of the solutions would be successful on some level of destructing the mycotoxins and preventing the future production of the toxins in storage by killing the fungi that produce them as well as drying the material of excess water. This level of destruction would be dependent on which solution and how it reacts when exposed to the rotary dryer.

Scanning electron microscopy images of ground corn and Amish sawdust were taken indicating the rotary biomass dryer had an effect on the fibrous texture and the porosity of the material. Increased porosity increases surface area of material which could hypothetically lead to increased exposure while using smaller volumes (1%) of the treatments. So a third hypothesis of this study is that the roasting via the dryer will allow more of the material to come into contact with the chemical treatments leading to decreased levels of mycotoxins at the 1% dilution.

The materials used included: ground corn contaminated with a known amount of aflatoxin commercial mycotoxin treatment, Sodium Hypochlorite, Sulfuric acid (95 97% purity), Peroxide (3% solution), a 6-inch rotary biomass dryer, scale, bucket, plastic zip bags for sampling, and Amish sawdust for cleansing the rotary dryer between treatments.

Mixing Solutions—
1. Commercial Solution: No dilution
2. Sodium hypochlorite: dilute to 2% with tap water
3. Piranha solution: Add 25 mL of hydrogen peroxide to 75 mL of concentrated sulfuric acid
   a. Add peroxide very slowly and carefully;
   b. Mix solution in glassware, never plastic;
   c. Be sure to let cool completely before adding to water;
   d. Mix in fume hood with goggles, gloves, and apron;
   e. Do not add any organic materials, acids or bases because it could result in explosion; and
   f. Dilute to 2% by slowly adding 2 mL of solution to 98 mL of water.

Determining Concentrations
1. Each solution was tested at the 0, 1, and 4% concentration on the premise that 1 mL water=1 gram mass; and
2. A single sample of roasted and untreated corn will serve as the "0%" for each solution.

Hand Mixing/Roasting
1. 115 mg of AFB1 was added to 10 kg of ground corn then distributed in 120 pounds of ground corn;
2. Prior to sampling, 1 bag of ground corn was thoroughly mixed;
3. Each treatment sample was 1 kg measured using small laboratory scale;
4. Samples were mixed with appropriate volumes of each solution in a clean plastic zip bag;
5. Samples were allowed to sit 10 minutes before roasting; and
6. The 6-inch rotary biomass drier was brought to temp (275-300 F) using Amish planar dust.

Each treatment batch was added to the vibratory feeder and followed by Amish planar dust for purging purposes. Samples were not taken until ⅔ of the load was through the rotary drier to ensure no cross contamination. Samples were collected in bags and kept open for a period of 10 minutes in order to flash of steam. Regarding the two commercial treatment samples that were not roasted: the appropriate volume of commercial solution was added and mixed by hand, then sampled into a bag. Samples were tested for mycotoxin concentrations.

TABLE 1

Contains the data retrieved from the second mycotoxin experiment that took place on Oct. 29, 2014. This experiment was a repeat of the first experiment to address some possible explanations for the data retrieved. Values highlighted in red are those that were not as we expected in the experiment.

| Sample Number/ID | Roasting Treatment | AFB1 (ppb) | AFB2 (ppb) | AFG1 (ppb) | AFG2 (ppb) | Percent Change from Raw Control for AFB1 | Percent Change from Lower Concentration for AFB1 |
|---|---|---|---|---|---|---|---|
| Raw control | Not roasted | 2273.8 | 81.4 | 789.9 | 20.0 | — | — |
| Roasted control | 275-300 | 1001.8 | 36.1 | 337.1 | 8.7 | −56% | — |
| Bleach 1% | 275-300 | 1953.2 | 70.1 | 705.1 | 18.4 | −14% | — |
| Bleach 4% | 275-300 | 2037.9 | 73.1 | 728.5 | 18.7 | −10% | 4% |
| Piranha 1% | 275-300 | 1835.4 | 65.0 | 909.2 | 23.0 | −19% | — |
| Piranha 4% | 275-300 | 2538.5 | 91.4 | 762.9 | 18.6 | 12% | 38% |
| Commercial 1% | 275-300 | 2110.0 | 74.7 | 723.4 | 17.4 | −7% | — |
| Commercial 4% | 275-300 | 2047.0 | 73.0 | 688.7 | 17.5 | −10% | −3% |
| Commercial hand 1% | Not roasted | 2225.6 | 78.7 | 705.8 | 16.9 | −2% | — |
| Commercial hand 4% | Not roasted | 2091.0 | 76.0 | 701.3 | 17.2 | −8% | −6% |

TABLE 2

Contains the data retrieved from the first mycotoxin experiment that took place on Jul. 28, 2014. This experiment was repeated to address some possible explanations for the data retrieved here. Values in red are those that were not expected in the experiment and solutions were drawn to remedy and retest possible issues with testing protocol.

| Sample Number/ID | Roasting Treatment | AFB1 (ppb) | Percent Change from Raw Control | Percent Change from Lower Concentration |
|---|---|---|---|---|
| Raw Control | Not roasted | 65 | — | — |
| Roasted Control | 275-350 F. | 8 | −88% | — |
| Commercial 1% | 275-350 F. | 8 | −88% | — |
| Commercial 4% | 275-350 F. | 10 | −85% | 25 |
| Sodium Percarbonate 1% | 275-350 F. | 37 | −43% | — |
| Sodium Percarbonate 4% | 275-350 F. | 45 | −31% | 22 |
| Bleach 1% | 275-350 F. | 114 | 75% | — |
| Bleach 4% | 275-350 F. | 150 | 131% | 32 |
| Potassium Hydroxide 1% | 275-350 F. | 153 | 135% | — |
| Potassium Hydroxide 4% | 275-350 F. | 126 | 94% | −18 |
| Piranha 1% | 275-350 F. | 96 | 48% | — |
| Piranha 4% | 275-350 F. | 171 | 163% | 78 |
| Commercial dryer mixed 1% | 275-350 F. | 220 | 238% | — |
| Commercial dryer mixed 4% | 275-350 F. | 138 | 112% | −37 |

TABLE 3

Contains the data retrieved from the original experiment that took place on Jan. 22, 2014 located in Enginuity Worldwide notebook "Shiloh 5", pages 22-23 and 28-29. This experiment was the groundwork for the two experiments that explored the usage of differing chemical pretreatments.

| Group | Treatment | Chemical Treatment | AFB1 before treatment (ppb) | AFB1 after treatment (ppb) | Percent Reduction |
|---|---|---|---|---|---|
| 1 | 20 min in autoclave | 2% KOH | 445 | 125 | 72 |
| 2 | 260 F./20 psi 20 min convection oven at 560 F. | 2% KOH | 445 | 128 | 71 |
| 3 | Treatment 1 and 2 combined (40 min total) | 2% KOH | 445 | 96 | 78 |

In this experiment, corn contaminated with aflatoxin was pretreated with 2% potassium hydroxide and then processed for 20 minutes in an autoclave at 260 F/20 PSI (group1), 20 minutes in a convection oven at 560 F (group 2), and a combination of autoclave and convection oven for 40 minutes (group 3). This resulted in a decrease of over 70% in all three treatment groups in aflatoxin B1 concentration (Table 3). This data leads one to believe that heat and pressure combined with a chemical pretreatment have a significant effect on the concentration of mycotoxins.

The experiments following this initial discovery are a further exploration into varying chemical treatments in combination with the rotary biomass dryer acting as a steam/pressure source. One experiment was completed but it resulted in data that was confusing to interpret and it was suspected that background noise was to blame. The experiment was repeated later using an improved sampling method. Table 1 shows data from the second iteration of the experiment. Every treatment aside from the 4% concentration of the piranha solution experienced a reduction in AFB1 when compared to the raw control corn. The 4% concentration of the piranha solution seemed to increase the amount of AFB1. There is a similar pattern seen in AFB2 and AFG1/2 concentrations. This correlates with the hypothesis that every treatment would have some degree of effect on the aflatoxin concentration.

It is unexpected that the largest decrease in aflatoxin concentration would be observed in the roasting treatment with no chemical treatment with a 56% decrease in experiment 2 and an 88% decrease in experiment 1. One may expect that every treatment group would have seen the effects of the roaster in the form of a 56% decrease and the chemical treatments would only further decrease the concentrations from that point, but this was not the case. It was also noted in Table 1 that in the case of the bleach and the piranha solution, the concentration of AFB1 increased with higher concentration of the treatment rather than decreased. The same pattern of increase was observed in the first iteration of the experiment. Table 2 contains the data collected from this first iteration. Here it was observed that every treatment with the exception of the potassium hydroxide increased in aflatoxin concentration as concentration of the treatment increased. Potassium hydroxide was the chemical treatment previously used. Without wishing to be bound by any theory or mechanism, a possible explanation for this phenomenon might be linked to the chemical properties of the treatments. The commercial treatment's chemical make-up is unknown but the bleach, piranha solution, and sodium percarbonate are all oxidizers. In the original experiment a 78% decrease in AFB1 concentration was observed using heat, pressure, and potassium hydroxide. While the mechanism is uncertain, there may be a link between oxidizers and the aflatoxin/fungus that would result in a better growing fungus or one that produces more aflatoxin. It is the opinion of a toxicologist at the University of Missouri that these chemicals would have no effect on the testing methods regarding a false positive or negative. A third experiment testing the effects of hydroxides at varying concentrations would be the logical next step regarding the rotary biomass dryer and the aflatoxin contaminated corn.

Not to be bound by any theory or mechanism, another hypothesis regarding the decreased kill rate amongst the chemical treatments when compared to the roasting only is that the addition of liquid acted as a buffer from the increased temperature of the screw. It is accepted that addition of material cools the screw and barrel of the rotary biomass dryer. It is a possibility that the addition of liquids cooled the material and therefore the screw/barrel below the kill temperature for the fungi as the batch was moving through the machine. This could have allowed fungi to survive and continue to produce these mycotoxins after the treatment was completed.

In experiment two, the commercial solution was tested at two concentrations (1% and 4%) while not being processed through the rotary biomass dryer. This was simply to establish a baseline for the effect of the commercial solution itself. It was expected that the commercial solution would have the largest decrease of all the solutions but this was not the case. The 1% concentration of the commercial solution decreased the AFB1 concentration by 2.1% and the 4% concentration decreased AFB1 levels by 8.0%. These values are much less than the 56% decrease experienced by the roaster only treatment group.

The production of frictional energy by the rotary biomass dryer appears to have a large impact on the concentrations of mycotoxins in ground corn via heat, steam, and pressure. However, this impact is not transferring to the various chemical treatments which experienced decreased kill rates when compared to the ground corn that was only roasted. It is uncertain if this is attributed to a difference in chemical nature of the compounds or if there is another mechanism at work. With the exception of the commercial solution whose chemical makeup is unknown, the treatments that experienced increases in AFB1 concentrations from 1% to 4% were all oxidizers. The only chemical compound that experienced a decrease from 1% to 4% solution in AFB1 concentrations was the potassium hydroxide. Therefore more exploration needs to be completed regarding the use of hydroxides and varying concentrations. In order to confirm and explain the data within this report, the path forward will include further experimentation to determine the effects of hydroxides and the frictional energy produced by the rotary biomass dryer.

The foregoing description of various forms of the disclosure has been presented for purposes of illustration and description. It is not intended to be exhaustive or to limit the disclosure to the precise forms disclosed. Numerous modifications or variations are possible in light of the above teachings. The forms discussed were chosen and described to provide the best illustration of the principles of the disclosure and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method, comprising:
providing an animal waste by-product having a moisture content between about 2 wt. % and about 90 wt. %;
processing the animal waste by-product through a rotary compression unit (RCU) having a screw and a barrel, the processing including applying compression and friction to the animal waste by-product, in an increasing manner, as the animal waste by-product moves through the RCU;
separating the animal waste by-product into steam and a processed material;
removing the steam; and
collecting the processed material.

2. The method according to claim 1, wherein the applying further comprises applying the compression and friction in manner that maintains a temperature of the animal waste by-product below 350 degrees Fahrenheit to provide non-destructive drying to form a fertilizer/soil conditioner as the processed material.

3. The method according to claim 1, wherein the applying further comprises applying the compression and friction in the increasing manner sufficient to cause hydrothermal carbonization and pyrolysis of the animal waste by-product.

4. The method according to claim 3, wherein the applying the compression and friction, to cause hydrothermal carbonization and pyrolysis, raises a temperature of the animal waste by-product at or above 350 degrees Fahrenheit to provide destructive drying to form any one of bio-oil, bio-fuel, bio-char, bio-coal, and combinations thereof, as the processed material.

5. The method according to claim 1, the method further comprising cooling the processed material at an aftercooler zone.

6. The method according to claim 1, wherein the animal waste by-product is manure obtained from at least one of cattle, swine, feed lot bedding, poultry litter, a digestate of animal waste by-products obtained from an anaerobic digester, municipal waste, waste meat renderings, waste meat, or a mixture thereof.

7. The method according to claim 1, wherein the animal waste by-product is poultry litter.

8. The method according to claim 1, wherein the processed material is a bio-oil, a bio-fuel, bio-char, or bio-coal.

9. The method according to claim 8, further comprising subjecting the bio-coal, bio-fuel, or bio-char to a second energy source and an activation agent in order to form activated carbon.

10. The method according to claim 1, wherein the animal waste by-product is a digestate of animal waste obtained from an anaerobic digester and the processed material formed is bio-coal.

11. The method according to claim 1, the method further comprises:
dewatering the animal waste by-product;
breaking down compacted or matted animal waste by-product;
sizing the animal waste by-product; and
adding fiber in the form of sawdust to the animal waste by-product; and
converting the processed material to a dried product in a transportable geometric form.

12. The method according to claim 11, further comprising shaping the dried product into a transportable geometric form corresponding to at least one of: a pellet, a log, a puck, or a briquette.

13. The method according to claim 1, the method further comprising operating at a temperature and pressure that kills bacteria, prions, and other microbes.

14. The method according to claim 1, the method further comprising adding organic and inorganic additives to the animal waste by-product to at least one of: (i) reduce boiler slagging and corrosion; (ii) boost a BTU output of the processed material when formed as a fuel source material; or (iii) sequester nutrients and metals in the processed material when formed as a fertilizer/soil conditioner to provide for timed or slow release.

15. The method according to claim 1, wherein the method further comprises moving one or more gases away from the processed material in order to form bio-char.

16. The method according to claim 1, wherein the processed material represents a fuel source material that comprises a bio-coal or bio-fuel and the method further comprises pretreating the fuel source material to remove inorganic compounds in order to form coke.

17. The method according to claim 1, wherein the method further comprises mixing and drying of the animal waste by-product by disrupting the flow and folding the animal waste by-product over.

18. The method according to claim 1, further comprising pelletizing the processed material without a separate densification process.

19. The method according to claim 1, wherein the processed material is bio-char and the bio-char is operable to adsorb hazardous waste materials to produce a solid waste product.

20. The method according to claim 1, wherein the processing further comprises processing the animal waste by-product through the RCU having a tapered compression screw.

21. The method according to claim 1, wherein the processing further comprises processing the animal waste by-product through the RCU having an adjustable nozzle to apply compression and friction to the animal waste by-product.

22. The method according to claim 1, wherein the processing further comprises processing the animal waste by-product through the RCU having a choke flange to apply compression and friction to the animal waste by-product.

23. The method according to claim 1, wherein the processing further comprises feeding the animal waste by-product to the RCU at a uniform feed rate.

\* \* \* \* \*